United States Patent [19]

Stoll

[11] Patent Number: 4,842,021

[45] Date of Patent: Jun. 27, 1989

[54] SUPPORT FOR FLUID POWER DEVICES

[76] Inventor: Kurt Stoll, Lenzhalde 72, 7300 Esslingen, Fed. Rep. of Germany

[21] Appl. No.: 899,743

[22] Filed: Aug. 21, 1986

Related U.S. Application Data

[63] Continuation of Ser. No. 756,049, Jul. 17, 1985, abandoned.

[30] Foreign Application Priority Data

Jul. 26, 1984 [DE] Fed. Rep. of Germany ....... 3427589

[51] Int. Cl.⁴ ............................................ F16K 31/02

[52] U.S. Cl. .................................... 137/884; 137/271; 137/561 R

[58] Field of Search ............... 137/884, 844, 854, 264, 137/554, 271, 561 R

[56] References Cited

U.S. PATENT DOCUMENTS

| | | | |
|---|---|---|---|
| 3,457,943 | 7/1969 | Kawobata | 137/884 X |
| 3,814,126 | 6/1974 | Klee | 137/884 |
| 3,895,648 | 7/1975 | Stoll et al. | 137/550 |
| 4,095,864 | 6/1978 | Hardin | 137/884 X |
| 4,214,292 | 7/1980 | Johnson | 267/158 X |
| 4,345,612 | 8/1982 | Komi et al. | 137/554 X |
| 4,355,653 | 10/1982 | Credle, Jr. | 137/854 X |
| 4,458,841 | 7/1984 | Laohanimi | 137/884 X |
| 4,469,128 | 9/1984 | Petrimaux et al. | 137/884 X |
| 4,507,707 | 3/1985 | Willis | 137/884 X |

*Primary Examiner*—A. Michael Chambers

*Assistant Examiner*—John C. Fox

*Attorney, Agent, or Firm*—McGlew & Tuttle

[57] ABSTRACT

A tray-like support for the mounting of a group of pneumatic or other control components such as valves so that they may operate different loads, comprises a mounting plate to carry the components. The mounting plate is connected with an elongated manifold for the compressed air or other driving fluid. The manifold has releasable means for connecting it with a driving fluid source and with ducts leading via the mounting plate to the components. The outlet ports of the components are joined with loads. The mounting plate is a laminated structure with internal ducts. The manifold is integral and is in communication with the source of driving fluid on one, while on the other side it is connected with ducts in the plate. The manifold has ducts therein leading from the mounting plate to loads and provided with rapid venting valves. On the side of the plate facing away from the components there is an electronic circuit board with a control system for the components.

1 Claim, 3 Drawing Sheets

SUPPORT FOR FLUID POWER DEVICES

This application is a continuation, of application Ser. No. 756,049, filed July 17, 1985 now abandoned.

BACKGROUND OF THE INVENTION

The present invention relates to a support for mounting fluid power devices such as valves, and more particularly to such a support comprising a mounting plate on which the components may be attached, a manifold for the distribution of a power fluid from a power fluid source, such manifold being adapted to be connected with the said source and ducts extending through the mounting plate to components mounted thereon whose outlets are connected with loads.

Valve supports designed on these lines are used in electrical-pneumatic control systems. In such a case fluid power components, more especially valves, are screwed on the mounting board and are connected by short hose connections with the manifold which is made up of a row of hose connectors. Furthermore the valves or the like have electrical connections for operating them. The system for operation of the valves is not mounted on the support but only connected therewith by way of wires placed in a harness. In addition to the connections for the supply and removal of the driving fluid (such as air) the valves each have a vent duct for letting off air both from the load supply duct and also the pilot valves placed on each valve.

The placing of the venting means in the valve itself makes the valve relatively large in size, since the venting of the air generally has to take place at a high speed, as is only possible if venting ducts with a very large cross section are used. A further factor mitigating against a compact design is the presence of flexible connection pipes, since such pipes are to be kept from being kinked. The also leads to a disadvantage inasfar as they require much labor to assemble, a simple plug connection not being sufficient for high operating pressures of the fluid so that such flexible pipes have to be fixed on the unions by clamps or the like. For some purposes it is often necessary to replace a complet valve support. This is made very much more difficult owing to the presence of the external control unit. A large amount of labor is required to detach and remake the electrical connections and there is furthermore the danger that connections will be wrongly made.

SHORT SUMMARY OF THE INVENTION

On object of the present invention is to devise a valve support or carrier that remedies these shortcomings of the prior art.

More specifically, a main object of the invention is the creation of a valve support that is economic to produce, is simple in construction and is compact so that it does not take up much space.

In accordance with a still further aim of the invention such a support is to be so designed that it has but a few connections that may be readily undone and made again between its separate components.

As a still further purpose of the invention the support is to be able to be readily serviced.

At the same time, if the valves are pneumatic, the discharge of air is to be greatly facilitated.

In order to achieve these or other objects, the component mounting plate is of laminated construction, the manifold is made integral and on its side facing away from the mounting plate is in communication with the source of driving fluid and with the loads and on the opposite side with connection ducts of the mounting plate and there are high-speed venting valves in the ducts leading to the respective loads and furthermore on the side of the mounting plate facing away from the components there is a detachable circuit board for electrical operation of the components.

The connection between the manifold and the mounting plate is made by way of plug-in connections, plug-in means also being used for fixing the components on the mounting plate and for the electrical connection of the valves. As a rule, in the manifold each load duct will have one venting valve that is designed in the form of a high-speed valve and is self operating. The circuit board is mounted directly on the mounting plate and the manifold.

The advantage of the arrangement in accordance with the invention is that it represents a very compact manner of construction, since the entire group of components is collected together in a very small space. This fact enables the designer to accommodate a large number of such valve supports in a very small amount of space without any risk of them interfering with each other. Furthermore an exchange or replacement of the complete valve support will be a very simple operation inasfar as there are no complex pipe and wire connections to be undone. The plug-in connections between the separate components made for convenient replacement of separate components on a valve support so that it is possible to make changes in the supply of the different loads without any very complex operation and simply by selecting a different mounting plate, which internally has a different arrangement of the connecting ducts. The mounting plates may for example be mass produced by pressure casting. By making the manifold integral there is the possibility of accommodating a large number of load supply ducts in a very small amount of space and equipping each such duct with a so-called high-speed venting or discharge valve. This valve will be so designed that air will be automatically and very rapidly discharged from it into the atmosphere. It is therefore not necessary to provide a load discharge duct and it will suffice if there is only a short duct for letting off air from the pilot valve. This in turn makes it possible to decrease the overall size of the valves.

The convenient parallel mounting of the electronic circuit board on the mounting plate furthermore only leads to a very slight increase in the amount of space required for the valve support amount despite the addition of the control means to the support to form a single unit. The circuit board may be attached by screws on the mounting plate and/or the manifold or, preferably, it may be attached by the use of rails so that the circuit board only has to be pulled out of position, if a defect should occur therein, and an undamaged inserted in its place. If the circuit board is placed on the mounting plate side which is opposite to the plane on which the components are mounted, the components will be freely accessible at all times. The connection of the components with the control means on the circuit board is by way of permanent wiring providing a connection of the components and the circuit board. Since the connection between the wiring and the circuit board is best by way of a plug, it is possible for the circuit board to be readily replaced in accordance with withever particular control function is desired and without it being necessary to make any modification to the wiring of the valve support.

There is furthermore the useful possibility of producing a direct electrical connection between the control means and the components. In such a case the components ae respectively swiveled about their axes normal to the mounting plane through 180° and mounted on the plate resting directly against each other. The electrical connections are at the sides of the mounting plate and run separately to each component. However, there is an advantage to be gained by also electrically supplying each row of valves via a common plug. Both arrangements make possible an even more compact and space saving system.

A more detailed account will now be given of the invention using the accompanying drawings that show embodiments of it.

LIST OF SEVERAL VIEWS OF THE FIGURES

DETAILED ACCOUNT OF THE INVENTION

Figure 1:
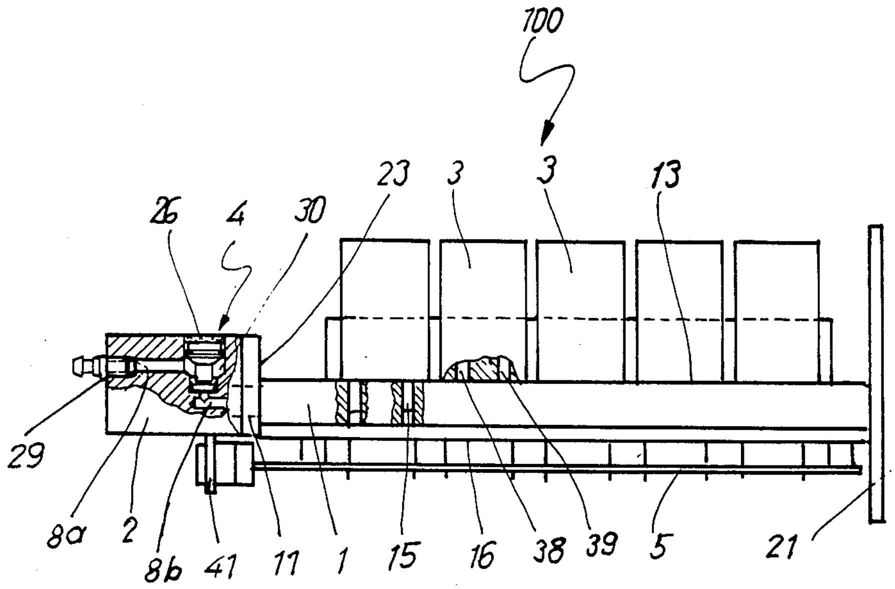
FIG. 1 is a side view of the valve support with the manifold shown partly sectioned.
Figure 2:
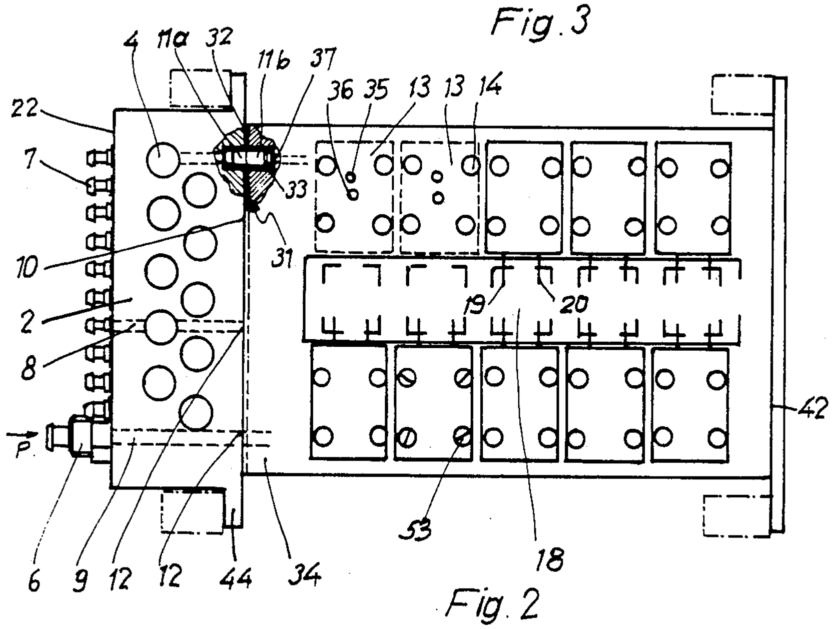
FIG. 2 is a plan view of the valve support.

On firstly referring to FIGS. 1 and 2, it will be seen that reference numeral 100 generally denotes a valve support or tray whose main parts are a manifold 2, a mounting plate 1 made up of layers, i.e. laminated, a circuit board 5, fluid power components 3, an indicator panel 21 and a bar 18 with plug sockets 19 and 20.

Figure 6:
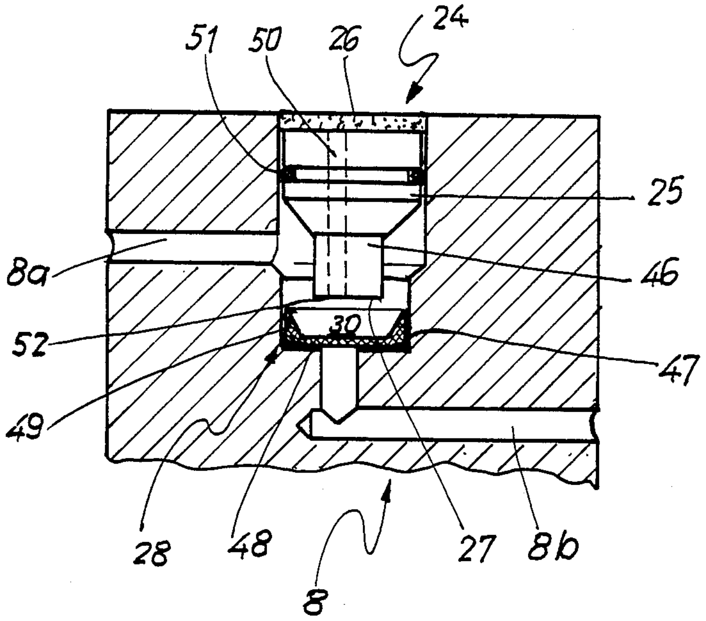
FIG. 6 shows one possible form of the high-speed air venting valve.

The manifold 2 has a front side 22 and a rear side 23, the latter facing towards the mounting plate 1. On the front side there is a feed connection 6 and load connections 7, which are best designed in the form of nipples for connection with pieces of pneumatic hose. The form of the invention illustrated only has one feed connection 6 and ten load connections 7, although this is only by way of example of the invention and not by way of limitation, and more might be present. Starting at the feed connection 6 it will be seen that the manifold has a feed duct 9 extending through it, and furthermore there are load connectors 7 joining with linking ducts 8. The ends 12 of the ducts 8 open at the back side 23 of the manifold. Depending on the specific design of the valve support 100 some of the load ducts 8 in the manifold have venting or discharge valves 4 which are in the form of so-called high-spped venting valves. In the present form of the invention, which only represents one of a possible number of designs, each of the load ducts is fitted with a venting valve. The purpose of the venting valves is to seal off the load ducts when under the feed pressure from the outside atmosphere and after a drop in the feed pressure to automatically open and discharge air from the respective duct. For this purpose the load ducts 8 are so arranged that one section **8*a* adjoining the inlet port 29 of the respective load duct at the front, is in an offset plane, i.e. at a different level to a second duct section 8*b*, which is in communication with the respective duct end 12. The two duct sections 8*a* and 8*b* are joined together by way of a hole or transverse duct portion 30, in which the respective venting valve is placed (see also FIG. 6). Each such valve comprises a cylindrical valve plug 24, which is interference-fitted, screwed or locked by a circlip in the hole 30, there also being sealed washer 51. The outer side of the plug 24 is covered over by a filter 26 to keep out dirt while simultaneously functioning as a tubular guide and muffler for the escaping air. A pin-like neck 46 is fixed to and forms a downward coaxial continuation of the head 25 and extends into the hole 30. The flat lower end 27 of the neck 46 ends somewhat short of the floor 47 at the lower end of the hole so that there is a gap therebetween to allow for displacement of a sealing cup 28 placed between the end 27 of the neck and the floor, such displacement being in the axial direction of the plug 24. The sealing cup 28 has in this respect two end positions, one in which it rests on the floor 47 and one in which it rests on the end 27. The sealing cup 28 is made up of a seal base 48 corresponding to the full cross section of the hole 30 and a sealing lip 49 on the periphery of such base and extending towards the plug 24. The lip 49 is fashioned integrally with the floor 48 and surrounds it like a collar. The outer circumferential face of the said sealing lip 49 rests on the inner bore face of the hole 30 while however being able to be slid thereon in the axial direction of the plug 24. In the pressureless condition of the load ducts 8 the sealing cup 28 will be in the vicinity of the section 8*b* of the respective load duct so that its base 48 seals off the duct section 8*b* from the hole 30. The section 8*a* of the load duct is now connected with the outside atmosphere via a discharge duct 50 running though the plug 24. If now air under pressure is admitted into the load duct 8 via the duct section 8*b* the sealing cup 28 will be displaced towards the head 28 and will make contact with the end 27 of the neck 46 so that the end 52 of the discharge duct 50, which runs through the plug 24 to join the inside of the hole 30 with the outside, will be covered over and sealed off. The venting duct is therefore shut off and the air under pressure is able simultaneously to flow round the sealing lip 49 of the sealing cup 28** and thus flow to the load to be driven.

If the pressure in the duct section **8*b* falls, the pressure still in existence in the duct section 8*a* will thrust the sealing cup 28 back on the floor 47 of the hole 30 so that the base 48 of the cup will be pressed onto the floor 47 to make sealing contact therewith and the outer circumference of the sealing lip 49 will press against the bore of the hole 30. This displacement of the sealing cup 28 however simultaneously causes the opening 52 of the venting duct 50** to be cleared and the duct section will be vented to the outside.

The duct ends 12 in the manifold 2 are so widened that connection nipples 11 on one side 10 of the mounting plate 1 may be plugged into them. The connection nipples 11 may in this respect be made integrally with the mounting plate 1, or more conveniently, may be part of a gasket generally referenced 31 which is used as a connection element between the mounting plate 1 and the manifold 2. The sealing gasket 31 is preferably produced integrally from rubber or rubber-like material and on a plate-like body 32 has connection nipples **11*a* and 11*b* that are placed opposite each other in pairs to define respective duct sections therethrough. The one row of the nipples 11*a* is plugged air-tightly and detachably in the duct ends 12 of the manifold 2, whereas the second row 11*b* is mounted in a similar way in the openings 37 made in the connection side 10 of the mounting plate 1. Since in the vicinity of their openings the nipples 11 have a peripheral bead 31, whose external diameter before insertion is larger than the diameter of the holes in which they are fitted, the nipples are force-fitted in place and not able to come loose and fall out. It is naturally possible for openings to be made with internal retaining grooves into which the peripheral bead would be locked. Therefore a connection is produced via the sealing gasket 31 between the manifold 2 and the mounting plate 1. One flat face 34 of it serves in parts as a mounting site 13 for components 3, and at regular intervals has duct ports 35 and 37 in the mounting sites 13 for each valve to be secured thereto. These ports are joined by way of linking ducts, not shown in the figure and which are within the laminated mounting plate, with the ports 37 at the connection side 10 of the mounting plate 1 mating therewith, and furthermore they are connected via the nipples 11, 11***a* and 11*b* with the ducts 8 and 9. It is convenient if one of the ports 35 and 36 of each one mounting site 13 is always joined to the feed duct 9 or the feed connection 6 in the manifold 2. The second port or opening is respectively precisely aligned with one load duct 8 and one load connection 7. Each mounting site 13 has at least one locating opening 14 at which a component 3 may be detachably mounted. This is done for example by the use of locating nipples 15 on the side of a valve 3 facing the mounting site 13, such nipple 15 being inserted into the locating hole 14. It would furthermore be possible to have screws 53 for attachment. On its side turned mounting site 13 each component 3 has at least two ports 38 and 39, which in the mounted condition are aligned with the ports 35 and 36 in the mounting site exactly. The ports 38 and 39 lead into a respective valve feed duct and a valve outlet duct for connection with the load. The two ducts are not shown in any detail in the figure, which does not show any details of the valve construction either. Each component 3 does however have a separate venting device if it has a pilot valve.

Figure 3:
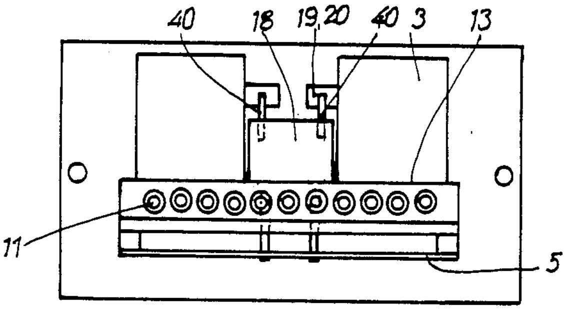
FIG. 3 is a front view of the valve support with the manifold.

The mounting sites 13 are best designed to accept two rows of components, there being the bar 18 with plug electrical connections between such longitudinal rows. It will be seen from FIG. 3 that electrical connection sockets 40 are arranged on the surface of the bar 18 for cooperation with the connection contacts 19 and 20 of a component 3, when it is placed on the mounting site 13, so that the component is securely held in place automatically. The connection contacts 19 and 20, which serve for supplying electrical pulses to the components for operation thereof, are placed one after the other on the valve with an equal spacing from the mounting site 13 so as to extend in the longitudinal direction. They are mounted on one of the side faces of the valves, which on the side with the ports 38 and 29, are generally perpendicular. This ensures that on mounting a component the connections are produced at the same time, that is to say on the one hand the connections between the ports 38 and 39 at the bottom of the valve with the ports 35 and 37 and on the other hand the electrical connections are produced. On referring again to FIGS. 1 and 2, it will be seen that the circuit board 5 is placed at a small distance from the surface 16 of the mounting plate, which is opposite the surface 34. The circuit board incorporates the electronic control circuitry for the valves. The plane of the circuit board 5 is in this respect conveniently made plane-parallel to the mounting plate so that the distance between the mounting plate and the circuit board may be made very small. In the present example of the invention the circuit board 5 is secured to the mounting plate 1 and simultaneously joined by way of a bracket 41 with the manifold 2. A further possible construction, not illustrated, would be one in which rails would be secured to the mounting plate so that the edges of the circuit board would be able to be taken up in grooves in such rails. This construction would simplify replacement of the circuit board. The circuit board 5 has a connection device for the supply of electrical power on its part next to the manifold 2. The electrical connection between the control instrumentality on the circuit board 5 and the connection bar 18 is by way of wiring, which on the one hand is connected, as for example by soldering, with sockets 40 (see FIG. 3) of the bar 18 while at the other end there is a plug connector to be inserted in a female element on the circuit board 5 in the form of a socket (not shown). This male contact element is readily unplugged on replacing the circuit board and there is no chance of the connections being confused during assembly. There is therefore more especially the possibility of operating the components 3 with a different control instrumentality simply by removing the circuit board 5 and putting a different one in its place.

In those cases in which an even more compact construction is called for, it is possible to dispense with the connection bar 18 so that the components would be placed next to each other (the mounting plate then being suitably modified). In such a case the components would be turned through 180° so that the connection contacts of two opposite components would be turned outwards and away from each other. The connection between the wiring and the individual valves would then be via separate male plug elements or by way of a connection bar plugging into which all connection contacts at the same time. This form of construction has the advantage that the breadth would only be dependent on the overall size of the components. Such a design is not however illustrated herein.

On the end 42, opposite to the connection side 10 of the mounting plate 1 it is possible for there to be a check or monitoring panel 21 for visible display elements 43 to inform the user of the equipment of the condition of each of the components. In addition to this, it is convenient to mount individual switches 17 on the panel for the individual operation of the components if the need should arise. This form of the apparatus is more particularly of value when it comes to checking the function of the separate components one by one.

The valve support of the invention makes possible an extremely compact construction, an advantage that is particularly telling when a plurality of such valve supports are to be installed in locations when space is at a premium. In such cases the supports may be designed for rack mounting, i.e. to be slid into a rack like drawers.

The manifold 2 has lugs 44 at its outer ends with holes therein so that the manifold may be securely fixed to a housing for example. For the same purpose the display panel 21 has two holes 45. If the supports are to be mounted like drawers on a rack in a cabinet it is best for the lugs 44 to be in such a form that they may be slid into grooves in the housing.

Figure 4:
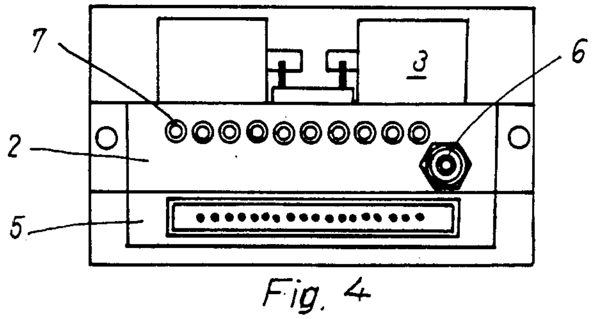
FIG. 4 is a front view of the entire valve support.
Figure 5:
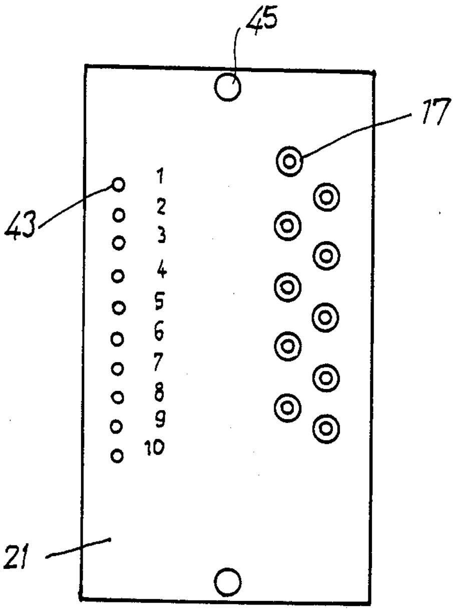
FIG. 5 is a rear view of the valve support.

The manifold 2 has an asymmetrical arrangement of the load connections 7 and of the supply connections 6, see FIG. 2 or 4. Another possible form is one in which each connection is symmetrical in relation to the load connections and placed in the center of the manifold 2. This provides for a particularly simple arrangement of the distribution ducts, which are placed within the mounting plate 1, since the feed duct runs through the mounting plate 1 in the length direction thereof and the individual mounting sites for the components 3 are supplied by way of branch ducts. The load ducts in the mounting plate are placed in a single plane in the mounting plate 1.

By using an offset arrangement of the high-speed venting valves 4 in the manifold 2 (that is to say with one valve in one row opposite a gap between two valves in the opposite row, as in FIG. 2) it is possible for the breadth of the manifold to be made very small, this leading to a compact construction without interference with access.

The arrangement of the valve support in accordance with the invention makes it possible to dispense with connection by way of pneumatic hose and with a complex system of connections with an external control instrumentality. A further point is that all the components of the valve support may be plugged together with male and female elements, something greatly simplifying replacement of separate parts.

A further useful characteristic of the mounting plate, which may also be termed a hybrid combination plate, is that it is not only possible for electrical circuits to be built up on it but furthermore electrical and pneumatic functions may be established, as for example with a multiple arrangement of pneumatic-electrical transducers and pneumatic transducers, of purely electronic components, as for example high-speed venting valves, and components providing for a choke function.

Such so-called hybrid technology has the advantage of offering the user a compact construction with an accompanying economy in the utilization of the available space. As still further beneficial effect is to be seen in the possibility of rapid replacement and exchange of components owing to the so-called multi-pole plug in system, both for pneumatic connections and also for electric ones. Furthermore, the buyer is given good value for money owing to the avoidance of expensive and slowly assembled hose connections.

I claim:

1. A valve support for a plurality of electrically operated pneumatic valve components comprising:

a mounting plate having a component surface with a plurality of component sites, an opposite surface, a first edge face between said component and opposite surfaces on one end and a second edge face between said component and opposite surfaces at an opposite end, said component sites lying in two parallel spaced apart rows extending between said first and second edge faces, said mounting plate having a plurality of compressed air ducts therein each extending to said first edge face, each component site being adapted for receiving one valve component and including at least one compressed air port communicating with at least one of said compressed air ducts; an electronic circuit board detachably connected to said opposite surface of said mounting plate, said circuit board being planar and parallel to said opposite surface of said mounting plate; a plug-in bar on said component surface of said mounting plate extending between said two rows of component sites at a location spaced from said component sites and connected to said circuit board, for making electrical connections to valve components positioned at component sites on said mounting plate, said plug-in bar having an upper surface spaced above said component surface and a plurality of electrical connection sockets at said upper surface; wiring connected to said sockets; a plug connector electrically connected to said wiring; said circuit board being detachably plugged to said plug connector for electrical connection to said sockets; an elongate manifold having compressed air feed and load ducts; a double nipple plug-in sealing plate connected between said mounting plate and said elongate manifold which said manifold is detachably mounted to said first edge face of said mounting plate for inter connecting said feed and load ducts to said compressed air ducts in said mounting plate, said manifold further having a discharge duct connected to atmosphere for each load duct; a pressure venting valve in each load duct of said manifold for venting pressure to each discharge duct; a display panel connected to said second edge face of said mounting plate, said display panel having a display for showing the operating state of valve components at said component sites of said mounting plate and having means for controlling the operation of valve components at said component sites; each component site further having a plurality of openings; and a plurality of pneumatic valve components connected to said mounting plate, each valve component being at one of said component sites, each valve component having at least one connection contact extending laterally therefrom over said upper surface of said plug-in bar and plugged into one of said connection sockets, each valve component being movable toward said component surface of said mounting plate for connecting each valve component to its respective component site, and each valve component having guiding projections extending into said component site openings during such movement to ensure simultaneous plugging engagement of its connection contact into its connection socket; so that said circuit board can be readily changed by unplugging from said plug connector and said valve components can be readily changed by unplugging from said connection sockets and from said component sites.

* * * * *